Figure 2:
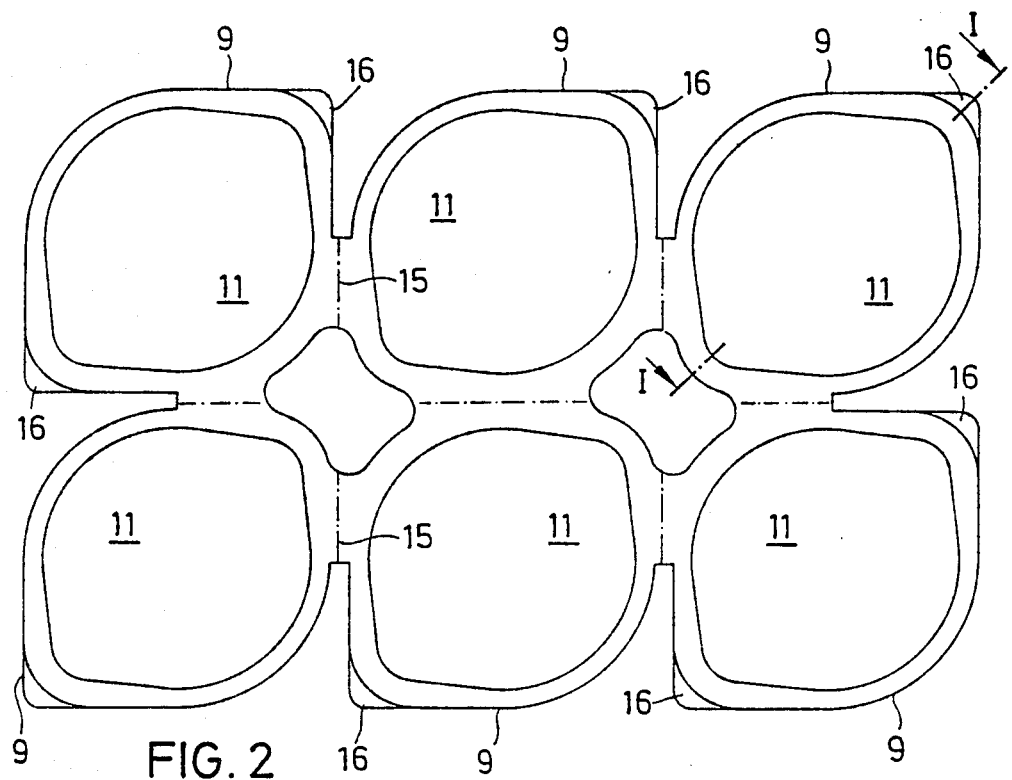

United States Patent [19]

Woltermann

[11] Patent Number: 4,859,337

[45] Date of Patent: Aug. 22, 1989

[54] FILTER FOR MAKING PORTIONS OF COFFEE OR TEA

[76] Inventor: Erich H. Woltermann, Ameisenweg 3, 4950 Minden, Fed. Rep. of Germany

[21] Appl. No.: 71,957

[22] Filed: Jul. 10, 1987

[30] Foreign Application Priority Data

Jul. 16, 1986 [DE] Fed. Rep. of Germany ....... 3623952

[51] Int. Cl.$^4$ ............................................ B01D 23/28
[52] U.S. Cl. .................................. 210/474; 210/478; 210/479; 210/481; 210/497.3; 426/79; 426/86; 426/108; 426/110; 426/126; 426/133
[58] Field of Search ............... 426/108, 110, 124, 119, 426/126, 133, 127, 316, 319, 78, 79, 86; 210/473, 474, 477, 478, 481, 497.3, 479; 99/295

[56] References Cited

U.S. PATENT DOCUMENTS

| | | | |
|---|---|---|---|
| 3,334,574 | 8/1967 | Douglas | 210/474 |
| 3,615,708 | 10/1971 | Abile-Gal | 210/474 |
| 4,080,299 | 3/1978 | Bartolome | 210/481 |
| 4,149,454 | 4/1979 | Kemp | 210/481 |
| 4,231,876 | 11/1980 | Zimmerman et al. | 210/481 |
| 4,255,265 | 3/1981 | Greutert | 210/474 |
| 4,344,974 | 8/1982 | Sirtl | 426/319 |
| 4,417,504 | 11/1983 | Yamamoto | 210/474 |
| 4,584,101 | 4/1986 | Kataoka | 426/124 |

*Primary Examiner*—Peter Hruskoci
*Assistant Examiner*—Wanda L. Millard
*Attorney, Agent, or Firm*—Goodman & Teitelbaum

[57] ABSTRACT

The invention relates to A filter for making portions of coffee or tea, comprising a substantially cup-shaped supporting vessel having a pouring-in opening at the top, a chamber for filling with liquid and having an outlet opening at the bottom, and a filter insert disposed in the supporting vessel above the outlet opening, wherein the filter insert (5) comprises a filter mat and extends approximately parallel to the inner wall of the supporting vessel and its periphery is connected to the supporting vessel (1) in the edge region of the pouring-in opening (2).

16 Claims, 1 Drawing Sheet

U.S. Patent

Aug. 22, 1989

4,859,337

FILTER FOR MAKING PORTIONS OF COFFEE OR TEA

The invention relates to a filter for making portions of coffee or tea, comprising a substantially cup-shaped supporting vessel having a pouring-in opening at the top, a chamber for filling with liquid and having an outlet opening at the bottom, and a filter insert disposed in the supporting vessel spaced above the outlet opening.

Known filters for making portions of coffee or tea comprise an insert in the form of a mat disposed horizontally on both sides of the ground coffee, measured portions of which are disposed inside the mat. This arrangement, however, does not ensure optimum use of the ground coffee when water is poured on. Known filters, already filled with ground coffee, come in large packages which are made air-tight and filled with inert gas to prevent the ground coffee from losing its aroma during storage. However, when the large package is opened to take out an individual filter, the filters remaining in the package no longer have an aroma seal, and consequently the quality of the coffee suffers after prolonged use.

The object of the invention, starting from a filter of the initially-described kind, is to improve it so that the powdered coffee in the filter is used in optimum manner and so as to ensure that the quality is not impaired even after long storage. Another aim is to produce and pack the filter according to the invention in an economic, completely automatic manner.

To this end, according to the invention, the filter insert comprises a filter mat and extends approximately parallel to the inner wall of the supporting vessel and its periphery is connected to the supporting vessel in the edge region of the pouring-in opening. As a result of this construction, the filter according to the invention operates in the same manner as known domestic filters, so that optimum use is made of the ground coffee when water is poured on the filter. However, the supporting vessel or container and the filter insert form a unit according to the invention, so that the filter does not have to be inserted separately. The filter mat according to the invention is designed so that the filter insert can be manufactured by deep drawing and therefore economically, and also retains all its filter properties after the deep-drawing process, thus ensuring that the filter mat and the supporting container have no effect on taste.

The material of which the filter insert according to the invention is made, in conjunction with a polyethylene layer coating the inner side of the supporting vessel, enables the filter insert to be joined to the supporting container by sealing, e.g. hot sealing, in the junction area, resulting likewise in very low production costs. This method also ensures a reliable join between the two parts without additional materials.

The invention also provides a package by means of which the filter according to the invention, filled with coffee or tea, can be stored for a long period without losing aroma, and filters containing portions can be used without impairing the durability of the remaining filters. To this end according to the invention, the filter according to the invention is enclosed in air-tight manner in an individual pack. Advantageous embodiments of individual packs are disclosed below. The construction according to the invention ensures that industrial manufacture is economic and that the ground coffee or tea in the pack is preserved without damage by oxygen or water vapour.

In addition, the package according to the invention can also be manufactured as a multiple pack, e.g. a pack of six.

Figure 1:
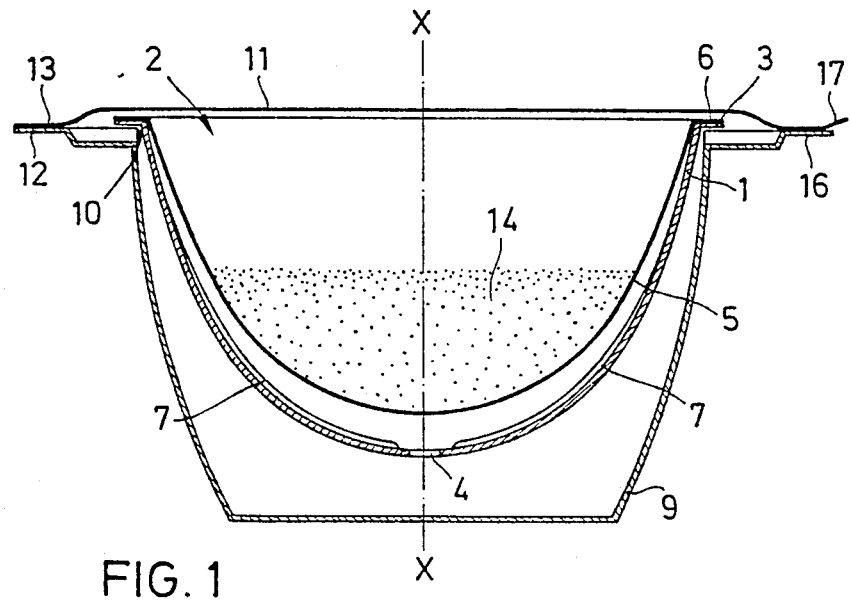

The invention will now be described in detail with reference to embodiments shown in the accompanying drawings, in which:

FIG. 1 is a section through a filter according to the invention when packed, and FIG. 2 shows a pack of six filters As FIG. 1 shows, a filter according to the invention comprises a supporting vessel or container 1 which in the embodiment is cup-shaped and has a circular pouring-in opening 2. The supporting container is made from polystyrene foil, preferably by deep drawing, the polystyrene foil being coated with polyethylene on the inside of container 1. Container 1 has an outer edge 3 surrounding the pouring-in opening 2 and extending approximately at right angles to the container axis XX. Container 1 also has an outlet opening 4 disposed concentrically with opening 2, the axis XX extending through its centre. A filter insert 5 comprising a filter mat is disposed inside container 1. The shape of insert 5 is adapted to the shape of container 1, and thus extends approximately parallel to the wall thereof. The filter insert 5 is produced by deep drawing and is preferably made of a material containing 60–70%, preferably 65% polyester fibre and 30–40%, preferably 35% polypropylene fibre. As a result of this construction, the filter insert is tearresistant, physiologically safe and non-toxic, and sealable. The sealing properties are provided by the polypropylene. The filter insert 5 is peripherally disposed on and connected to the upper edge region of the supporting container so that the filter insert 5 is spaced above the outlet opening 2, as shown in FIG. 1. Advantageously the connection is produced by sealing, and accordingly the filter insert is constructed so that it ends at the peripheral edge 3, where it is connected to the supporting container by sealing. The inner polyethylene layer of the supporting foil of container 1 is used as a seal between the filter insert 5 and the supporting container. The sealing area is marked 6 in the drawing. Grooves radially extending from the outlet opening 4 are formed in the wall of container 1 and extend upwards towards the pouring-in opening 2. A number of grooves 7 can be formed at the periphery of container 1 and are open towards the inner side of container 1. Grooves 7 convey liquid coffee from filter insert 5 to the outlet opening 4 and also reinforce the supporting container 1.

As also shown in the drawing, the aforementioned filter comprising the supporting container and filter insert is packaged in an air-tight manner. The package is an individual pack comprising a receiving container 9 having an upper opening 10 sealed in air-tight manner by a cover foil 11. Advantageously the interior space of container 9 is filled with an inert gas such as nitrogen or carbon dioxide. Container 9 is made of foil which is impermeable to oxygen and water vapour. Advantageously use is made of a multi-layer foil comprising a PVC carrier foil covered successively with a polyethylene foil, an Eval foil and a second polyethylene foil. The PVC carrier foil is 300 to 400$\mu$ thick. The combined thickness of the other three foils is 65 to 75$\mu$, preferably 70$\mu$. The Eval foil is made of ethylene vinyl alcohol. This foil is mainly responsible for the gastightness, which can be 0.01%. The cover foil is an aluminium foil preferably 40μ thick, coated on one side with a polyethylene layer about 30μ thick, i.e. on the side facing the interior of container 9. Container 9 has a peripheral annual collar 12 to which the cover foil 11 is secured, preferably by sealing. The seal is produced between the PE coating the cover foil and the innermost PE layer of the multi-layer foil forming the receiving container. The width of the sealing area 13, i.e. the sealing gap, between the cover foil and the annular collar 12 is preferably 3 to 4 mm. As FIG. 1 also shows, the peripheral edge 3 of the supporting container 1 rests on an inner region of the annular collar 12 inwardly spaced from the sealing area 13. As FIG. 1 also shows, the supporting container 1 contains e.g. ground coffee 14.

FIG. 2 shows the individual packs in FIG. 1 connected in a pack of six, the individual containers 9 being constructed as individual deep-drawn parts and covered by a continuous cover foil. Lines of punch holes 15 are formed between the individual containers 9 and act as set breaking areas and enable the containers to be separated although the cover foil is removed only from the area surrounded by the punch holes 15. The seal connection at 13 enables the cover foil 11 to be pulled off. To facilitate the process, the annular collar 12 of each vessel 9 has one or two projections 16 extending from the sealing area and thus forming a flap 17 for pulling off foil 11.

I claim:

1. A filter for making portions of coffee or tea from a ground material of coffee or tea comprising:

a supporting member provided with an upper pouring-in opening and a rim surrounding said upper pouring-in opening;

said supporting member being a cup-shaped, inherently stable supporting vessel having a chamber for filling with liquid adjacent to said upper pouring-in opening;

said supporting vessel being provided with a lower outlet opening;

a bag-shaped filter insert disposed in said chamber of said supporting vessel spaced above said lower outlet opening;

said filter insert being a filter mat having a shape adapted to the shape of said supporting vessel so that said filter mat extends downwardly within said supporting vessel approximately parallel to inner wall of said supporting vessel;

an upper periphery of said filter mat being disposed on and connected to said rim of said supporting vessel to support said filter mat in a position spaced above said lower outlet opening;

a filling of the ground material of coffee or tea being disposed within said filter mat;

said supporting vessel and said filter mat together with said filling being arranged within an individual pack in a gas-tight arrangement;

said individual pack including a receiving vessel, said receiving vessel receiving and surrounding said supporting vessel within an interior space of said receiving vessel;

said receiving vessel being provided with an upper opening and an annular collar surrounding said upper opening of said receiving vessel;

said rim of said supporting vessel resting on an inner region of said annular collar of said receiving vessel;

sealing means for sealing said upper opening of said receiving vessel in a gas-tight manner to maintain said supporting vessel and said filter mat within said receiving vessel;

said sealing means being a cover foil disposed across said rim and upper pour-in opening of said supporting vessel in a sealing area;

said cover foil being connected by sealing to an outer peripheral region of said annular collar of said receiving vessel; and said rim of said supporting vessel being inwardly spaced from said sealing means at said outer peripheral region of said annular collar of said receiving vessel.

2. A filter according to claim 1, wherein the filter mat is a deep-drawn part made of tear-resistant material which is physiologically safe and non-toxic.

3. A filter according to claim 2, wherein the filter mat is made of sealable material and the peripheral connection between the filter mat and the supporting vessel comprises a seal.

4. A filter according to claim 2, wherein the filter mat is made of approximately 60–70% polyester fibre and approximately 30–40% polypropylene fibre.

5. A filter according to claim 1, wherein the supporting vessel comprises a polystyrene foil and an internal layer of polyethylene.

6. A filter according to claim 1, wherein channels extending radially from the outlet opening towards the pouring-in opening are engraved in the wall of the supporting vessel and are open towards the interior thereof.

7. A filter according to claim 1, wherein the pouring-in opening of the supporting vessel is surrounded by an edge of said rim extending approximately at right angles to the supporting vessel axis.

8. A filter according to claim 7, wherein the filter mat is connected at the edge to the supporting vessel by a sealing layer.

9. A filter according to claim 1, wherein the sealed interior of the individual pack is filled with a protective gas.

10. A filter according to claim 9, wherein said protective gas is nitrogen.

11. A filter according to claim 9, wherein said protective gas is carbon dioxide.

12. A filter according to claim 1, wherein the receiving vessel is made from a multi-layer foil impermeable to gas or water vapour.

13. A filter according to claim 12, wherein the multi-layer foil comprises a polyvinyl chloride supporting foil which forms the exterior of the wall of the receiving vessel and is covered in succession by a polyethylene foil, an ethylene vinyl alcohol foil and a second polyethylene foil.

14. A filter according to claim 13, wherein the polyvinyl chloride foil has a thickness of 300 to 400μ, and the other three foils together have a thickness of 65 to 75μ.

15. A filter according to claim 1, wherein the cover foil comprises an aluminium foil coated with polyethylene on the side facing the inner side of the receiving vessel.

16. A filter according to claim 1, wherein the sealing area has a gap width of about 3 to 4 mm.

* * * * *